UNITED STATES PATENT OFFICE.

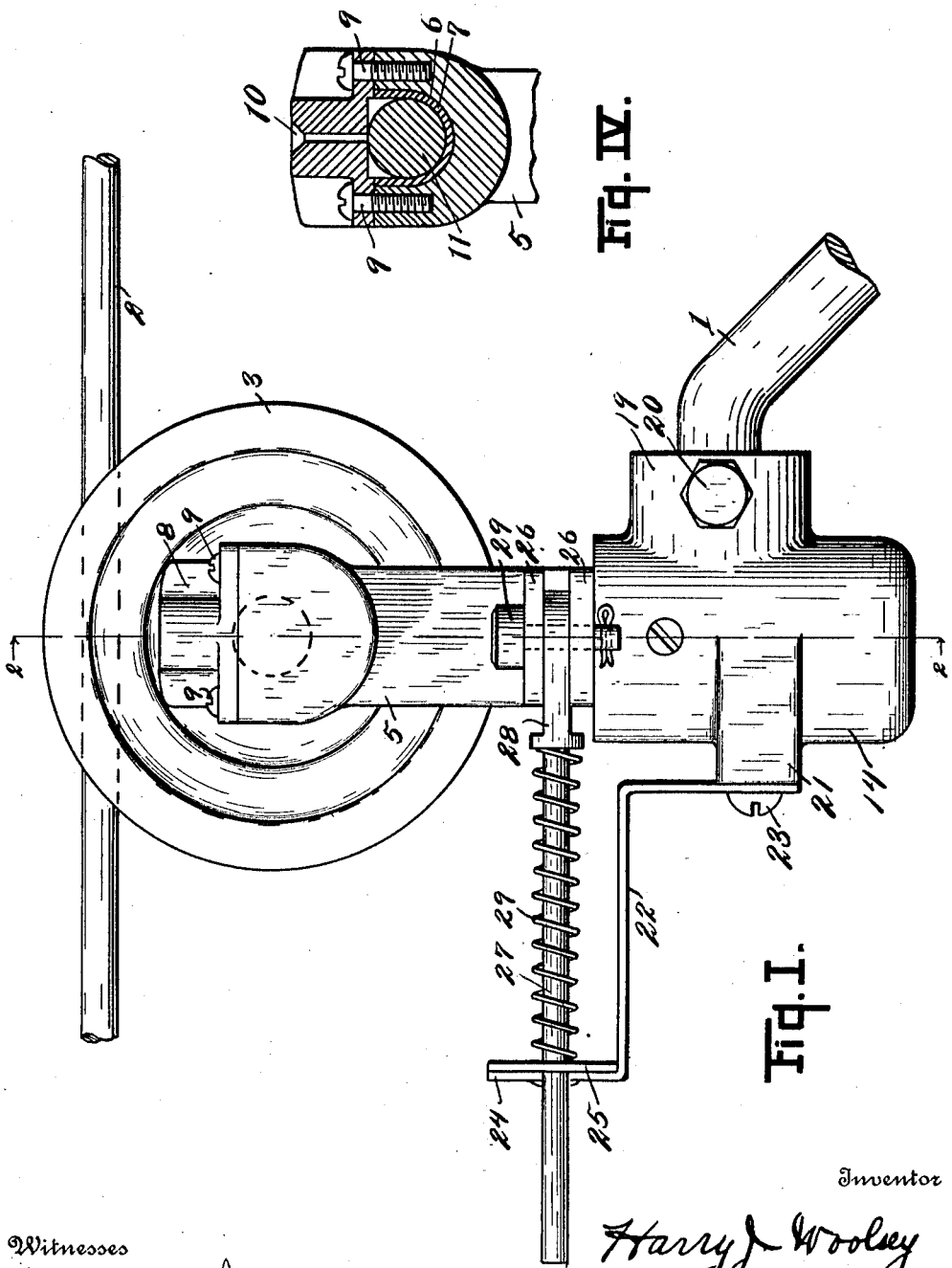

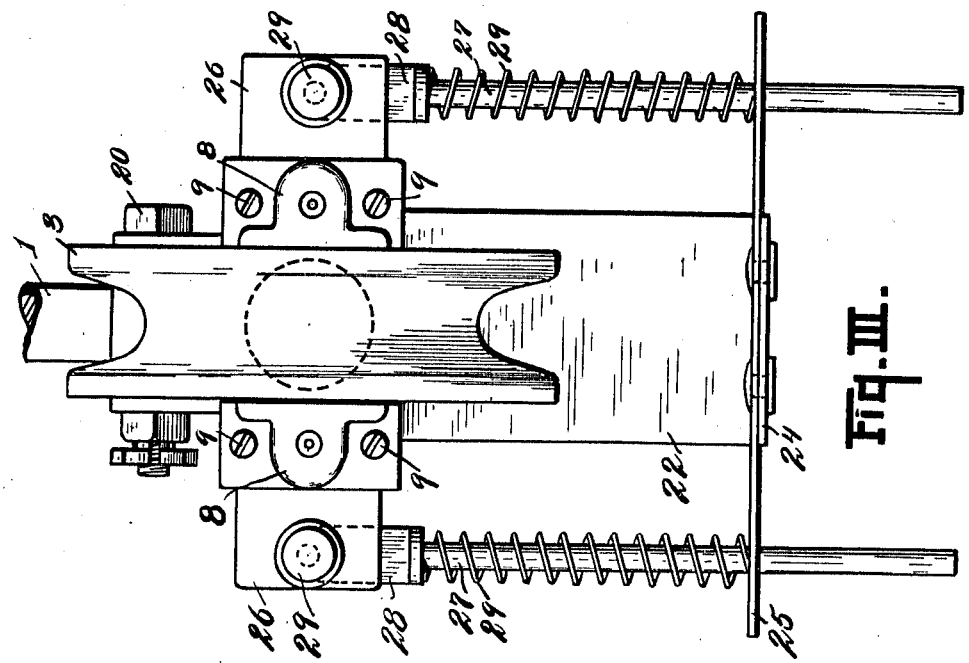

HARRY J. WOOLSEY, OF JACKSON, MICHIGAN, ASSIGNOR OF ONE-HALF TO GEORGE E. SCHUBERG, OF JACKSON, MICHIGAN.

TROLLEY-HEAD.

1,020,172. Specification of Letters Patent. Patented Mar. 12, 1912.

Application filed September 8, 1911. Serial No. 648,276.

*To all whom it may concern:*

Be it known that I, HARRY J. WOOLSEY, a citizen of the United States, residing at Jackson, Michigan, have invented certain new and useful Improvements in Trolley-Heads, of which the following is a specification.

This invention relates to improvements in trolley heads.

The main objects of this invention are: First, to provide an improved trolley head by which the wheel is yieldingly supported to permit it to follow curves and bends of the trolley wire. Second, to provide a structure having these advantages which is simple and economical to produce and not likely to get out of repair in use.

Further objects, and objects relating to structural details will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation of a structure embodying the features of my invention, it being shown mounted upon a trolley pole 1 and in operative relation to a trolley wire 2. Fig. II is a vertical central section taken on a line corresponding to line 2—2 of Fig. I. Fig. III is a plan view of the structure shown in Figs. I and II. Fig. IV is a detail vertical section taken on a line corresponding to the broken line 4—4 of Fig. II, showing details of the trolley wheel bearings.

In the drawings, similar reference characters refer to similar parts throughout the several views and the sectional views are taken looking in the direction of the little arrows at the ends of the section lines.

Referring to the drawing, I illustrate my improved trolley head as being mounted upon a trolley pole 1 and in operative relation to a trolley wire 2. The trolley wheel 3 is grooved, as is common practice, to receive the trolley wire. The trolley head comprises a wheel member 4 which is forked or provided with a pair of upwardly-projecting arms 5 having bearings 6 opening at the upper ends of the arms. These bearings are provided with bushings 7, which are U-shaped in cross section and provided with outer end portions, engaging the ends of the wheel journals, as clearly shown in Figs. II and IV. The bushings are preferably formed of some material which is a good electrical conductor.

The bearing caps 8 are removably secured by screws 9 and provided with oil holes 10, through which the lubricant is supplied to the journals 11 of the wheel. The journals 11 are, in the structure illustrated, formed integrally with the wheel. The wheel member is provided with a downwardly-projecting spindle 12, which is arranged in a suitable bearing 13 provided therefor in the pole member 14. To retain the wheel member spindle in its bearing, the spindle is provided with an annular groove 15 into which the retaining screw 16 on the pole member projects, see Fig. II.

The upper end of the pole member is provided with a bearing surface 17 on which the wheel member rests, the wheel member having coacting bearing surfaces 18. The pole member is provided with a socket 19 for the pole 1, the pole being retained in the socket by means of the set screw 20.

On the rear side of the pole member is a boss 21, to which the arm 22 is secured by means of the screw 23. The arm 22 projects rearwardly, its rear end 24 being turned upwardly. A cross piece 25 is secured to this upturned end of the arm 22.

Projecting laterally from the side of the wheel member are pairs of ears 26. Rods 27, having flattened pivot heads 28, at their forward ends, are secured to the ears 26 by means of the pivots 29, the heads 28 being arranged between the pairs of ears. The rear ends of the rods 27 are slidably arranged through the cross piece 25. Springs 29 are arranged on the rods 27, the rear ends of the springs being supported by the cross piece, while their forward ends bear against the heads 28 to act on the rods. These springs yieldingly support the wheel member so that the wheel is yieldingly supported in alinement with the pole. However, when the trolley wire curves, as in going around a corner, the wheel member swings on its spindle against the tension of one of the springs 29, the wheel following the curve of the wire.

When the trolley head or fork is unyielding, the wheel flanges engage the wire with a good deal of friction, frequently causing the wheel to leave the wire and also subjecting it and the wire to severe wear. By supporting the wheel yieldingly, it follows the wire, as stated, and is not likely to leave the same, and further, the wear on the parts is much reduced.

Although my invention is capable of considerable modification in structural details, I have not attempted to illustrate or describe such modifications, as the disclosure made will enable those skilled in the art to which this invention relates to apply my improvements as conditions require or taste may dictate.

Having thus described my invention, what I claim as new and desire to secure by Letters Patent is:

1. A trolley head comprising a forked wheel member provided with wheel bearings and with a central downwardly-projecting spindle having an annular groove therein, a pole member having a bearing therein for said spindle provided with a bearing surface at its upper end, said wheel member being provided with coacting bearing surfaces; a retaining screw on said pole member engaging said groove in said spindle; a rearwardly-projecting arm on said pole member having its outward end turned upwardly; a cross piece on the upturned end of said arm; pairs of laterally-projecting ears on said wheel member; rods having head portions arranged between said ears and pivotally connected thereto, said rods being slidably arranged through said cross piece at the outer end of said arm; and springs arranged on said rods, the other ends of the springs bearing against said arm and their inner ends against said head portions.

2. A trolley head comprising a forked wheel member provided with wheel bearings and with a central downwardly-projecting spindle, a pole member having a bearing therein for said spindle provided with a bearing surface at its upper end, said wheel member being provided with coacting bearing surfaces; a rearwardly-projecting arm on said pole member having its outer end turned upwardly; a cross piece on the upturned end of said arm; pairs of laterally-projecting ears on said wheel member; rods having head portions arranged between said ears and pivotally connected thereto, said rods being slidably arranged through said cross piece at the outer end of said arm; and springs arranged on said rods, the outer ends of the springs bearing against said arm and their inner ends against said head portions.

3. A trolley head comprising a wheel member provided with wheel bearings and with a downwardly-projecting spindle; a pole member having a bearing therein for said spindle; a rearwardly-projecting arm on said pole member having a cross piece at its outer end; pairs of laterally-projecting ears on said wheel member; rods having head portions arranged between said ears and pivotally connected thereto, said rods being slidably arranged through said cross piece at the outer end of said arm; and springs arranged on said rods, the outer ends of the springs bearing against said arm and their inner ends against said head portions.

4. A trolley head comprising a wheel member provided with wheel bearings and with a downwardly-projecting spindle; a pole member having a bearing for said spindle; an arm on said pole member; rods pivotally connected to said wheel member and slidably associated with said arm; and springs arranged on said rods to act thereon, the outer ends of said springs being supported by said arm.

5. A trolley head comprising a wheel member provided with wheel bearings and with a downwardly-projecting spindle; a pole member having a bearing thereon for said spindle; rods pivotally connected with the sides of said wheel member and slidably associated with said pole member; and springs arranged on said rods to act thereon, the outer ends of said springs being supported by said pole member.

In witness whereof, I have hereunto set my hand and seal in the presence of two witnesses.

HARRY J. WOOLSEY. [L. S.]

Witnesses:
W M. E. JACKSON,
H. E. TRUMBULL.

---

Copies of this patent may be obtained for five cents each, by addressing the "Commissioner of Patents, Washington, D. C."